United States Patent
Sheppard

(10) Patent No.: US 12,554,490 B2
(45) Date of Patent: Feb. 17, 2026

(54) ROTATING DATA BLOCKS

(71) Applicant: Graphcore Limited, Bristol (GB)

(72) Inventor: Mark Sheppard, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 37 days.

(21) Appl. No.: 18/543,036

(22) Filed: Dec. 18, 2023

(65) Prior Publication Data

US 2024/0201988 A1 Jun. 20, 2024

(30) Foreign Application Priority Data

Dec. 20, 2022 (GB) .................................. 2219286

(51) Int. Cl.
*G06F 9/30* (2018.01)
*G06F 1/08* (2006.01)

(52) U.S. Cl.
CPC ............ *G06F 9/30032* (2013.01); *G06F 1/08* (2013.01); *G06F 9/30038* (2023.08)

(58) Field of Classification Search
CPC ..... G06F 9/30032; G06F 9/30038; G06F 1/08
See application file for complete search history.

(56) References Cited

U.S. PATENT DOCUMENTS

| 6,393,446 B1 * | 5/2002 | Dhong .................... G06F 7/762 |
| | | 708/209 |
| 6,675,182 B1 | 1/2004 | Hofstee et al. | |
| 2011/0296112 A1 * | 12/2011 | Li ...................... G06F 12/0864 |
| | | 711/E12.001 |
| 2013/0007080 A1 | 1/2013 | Liu | |

FOREIGN PATENT DOCUMENTS

| EP | 0757312 A1 | 2/1997 |
| JP | 60173626 | 9/1985 |

OTHER PUBLICATIONS

Search Report dated Jun. 19, 2023 for United Kingdom Patent Application No. GB2219286.8.
Search Report and Written Opinion dated Feb. 23, 2024 for International Application No. PCT/EP2023/082443.

* cited by examiner

*Primary Examiner* — Zachary K Huson
(74) *Attorney, Agent, or Firm* — HAYNES AND BOONE, LLP

(57) ABSTRACT

An execution unit performs a byte-wise rotation of an input data block. An input data array receives an input data block. Two first layer multiplexer arrays each receive a first layer data block comprising a respective subset of bytes of the input data block and a first layer control signal, and rotate the first layer data block by an amount indicated by the first layer control signal. The second layer multiplexer array receives a second control signal and selects between a corresponding byte of the first and second rotated first layer data blocks based on the second control signal. The execution unit also includes a control signal generator, configured to generate the first layer control signal and second layer control signal based on a received computer program instruction. Results of smaller block rotations are thus used as partial results for larger block rotation, avoiding large multiplexer arrays with complex wiring.

20 Claims, 11 Drawing Sheets

Figure 9

```
// First data block
ldconst $a0, 0x03020100        ← 91
ldconst $a1, 0x07060504

// Second data block
ldconst $a2, 0x0b0a0908        ← 92
ldconst $a3, 0x0f0e0d0c // Configure $PACK to insert 3 bytes from the first block at position 1 into
// the second block at position 5.
setzi $m0, 0x50103    ← 93
put $PACK, $m0        ← 94

// Execute pack instruction on two 8-byte blocks
pack64 $a0:1, $a0:1, $a2:3    ← 95
```

Figure 10

```
// First data block
ldconst $a0, 0x03020100
ldconst $a1, 0x07060504
ldconst $a2, 0x0b0a0908        1001
ldconst $a3, 0x0f0e0d0c // Second data block
ldconst $a4, 0x13121110        1002
ldconst $a5, 0x17161514
ldconst $a6, 0x1b1a1918
ldconst $a7, 0x1f1e1d1c // Configure $EXTRACT to extract the output block starting from byte
// 7 of the concatenation of the input blocks.
setzi $m0, 0x7           1003
put $EXTRACT, $m0        1004

// Execute extract operation
extract128 $a0:3, $a0:3, $a4:7
                                1005
```

ROTATING DATA BLOCKS

CROSS-REFERENCE TO RELATED APPLICATIONS

The present application claims priority to United Kingdom Patent Application No. GB2219286.8, filed on Dec. 20, 2022, the disclosure of which is hereby incorporated herein by reference.

FIELD

The present disclosure relates to a logic circuit for performing byte-wise rotation of data blocks.

BACKGROUND

A processing device may comprise an execution unit and a memory. The execution unit is capable of executing one or more program threads in order to perform operations on data loaded from the memory to generate results, which are then stored in the memory. The results may be subject to subsequent processing by the execution unit or may be dispatched from the processing device.

SUMMARY

Data loaded from the memory by a processing device may have one of a plurality of predetermined block sizes, each block size having a fixed number of bytes, for example 4, 8 or 16 bytes. In various contexts, it may be necessary for the execution unit to rotate the data blocks of the various block sizes stored in the memory by an arbitrary number of bytes up to the block size. As the name suggests, "rotating" the data block by the arbitrary number of bytes involves moving bytes from the front of the block (i.e. having highest index) bytes have to the back of the block. For example, a 4 byte data block [A,B,C,D] rotated by 1 block is [B,C,D,A]. Rotation of blocks may for example be required in the process of aligning misaligned data.

Such rotation operations need to meet the relevant timing requirements, which may be problematic in the context of high-performance processing devices (e.g. processors for machine learning applications) having a relatively short clock period.

It is an aim of the present disclosure to provide a logic circuit that can carry out rotation operations within the timing requirements of such high-performance processing devices. It is a further aim of the present disclosure to provide means of carrying out rotation operations in a manner that reduces area cost and minimises power consumption.

According to a first aspect of the disclosure, there is provided an execution unit configured to execute a computer program instruction to perform a byte-wise rotation operation of an input data block, the execution unit comprising:
a logic circuit comprising:
an input data array to receive an input data block comprising N bytes;
two first layer multiplexer arrays, each first layer multiplexer array configured to:
receive a first layer data block comprising a respective subset of bytes of the input data block;
receive a first layer control signal;
rotate the first layer data block by an amount indicated by the first layer control signal;
the two first layer multiplexer arrays being configured to respectively output a first rotated first layer data block and a second rotated first layer data block;
a second layer multiplexer array configured to receive a second control signal, the second layer multiplexer array comprising N multiplexers, each multiplexer configured to select between a corresponding byte of the first and second rotated first layer data blocks based on the second control signal to output a rotated second layer data block, and
a control signal generator, configured to generate the first layer control signal and second layer control signal based on the received computer program instruction.

Each first layer data block may comprise N/2 bytes. N may equal eight.

The logic circuit may be extended by the addition of further layers to carry out rotation of larger input data blocks. In one example, the input data array is configured to receive an input data block comprising M bytes, where M>N, suitably where M=2N. M may equal sixteen. The logic circuit may comprise four first layer multiplexer arrays, so as to output first to fourth rotated first layer blocks. The logic circuit may comprise two second layer multiplexer arrays, a first of the second layer multiplexer arrays configured to receive the first and second rotated first layer blocks and output a first rotated second layer data block, a second of the second layer multiplexer arrays configured to receive third and fourth rotated first layer blocks and output a second rotated second layer block. The logic circuit may comprise a third layer multiplexer array configured to receive a third layer control signal. The third layer multiplexer array may comprise M multiplexers configured to select between a corresponding byte of the first and second rotated second layer data blocks based on the third control signal to output a rotated third layer data block. The control signal generator may be configured to generate the third layer control signal.

The blocks herein may comprise a number of bytes that is a power-of-two. For example, N and/or M may be a power-of-two.

The logic circuit may comprise an intermediate results array configured to receive the output of the first layer multiplexer arrays. The second layer multiplexer array may receive the first and second rotated first layer data blocks from the intermediate results array. In examples where the logic circuit comprises further layers, further intermediate results arrays may be disposed between consecutive layers.

Each first layer multiplexer array may comprise a plurality of S:1 multiplexers, suitably S S:1 multiplexers. S may be equal to the size of the subset of bytes of the input block. An input j of an $i^{th}$ S:1 multiplexer of the array may be connected to byte (i+j) mod S of a subset of the input data array corresponding to the respective subset of bytes.

The second layer control signal may comprise a bitmask of N bits, each bit in the bitmask acting as a control signal for a respective one of the N multiplexers of the second multiplexer array. The logic circuit may comprise circuitry to split the bitmask and supply the respective bits to the respective multiplexers.

The control signal generator may be configured to rotate the bitmask, wherein an amount of rotation of the bitmask results in output of the rotated second layer data block rotated by the same amount. The bitmask may be 0xF0.

The control signal generator may be configured to rotate the bitmask by selecting a stored rotated bitmask from a lookup table. The control signal generator may comprise circuitry configured to rotate the bitmask, such as bitshifting circuitry.

The third layer control signal may be a bitmask of M bits, with the third layer multiplexer array controlled similarly to the second layer control signal. The bitmask of the third layer control signal. may be 0xFF00.

The control signal generator may generate a second layer control signal that causes the second layer multiplexer array to act as a passthrough. Accordingly, the second layer multiplexer array may output the first and second rotated first layer data blocks. In examples comprising further layers, the control signal generator may generate control signals to cause the further layers to act as a passthrough. For example, the control signal generator may generate a third layer control signal that causes the third layer to act as a passthrough.

The logic circuit may comprise one or more clock gates configured to disable one or more elements of the logic circuit. The logic circuit may comprise a plurality of data path lanes, suitably N data path lanes. Each clock gate may be configured to disable one or more data path lanes. Each clock gate may be configured to disable N/2 or M/4 data path lanes, suitably corresponding to the input to one of the first layer multiplexer arrays. The clock gates may be configured to disable one of the first layer multiplexer arrays and the second layer multiplexer array. The control signal generator may be configured to generate a clock gate control signal to control the one or more clock gates.

The logic circuit may comprise a pipeline register disposed between the first layer multiplexer arrays and second layer multiplexer array.

The computer program instruction may be a rotate instruction, configured to rotate the input data block. The computer program instruction may comprise a plurality of operations, wherein the rotate operation is one of the plurality of operations. The computer program instruction may comprise a pack instruction, configured to copy a sequence of consecutive bytes from a first position in a first data block into a second location in a second data block. The rotate operation may align bytes of the first data block to an output position. The computer program instruction may be an extract instruction, configured to extract a sequence of consecutive bytes from a concatenation of a first data block and a second data block.

The execution unit may generate the first layer control signal, second layer control signal and optionally the third layer control signal based on values indicated by the computer program instruction. The values may be indicated in one or more operands of the computer program instruction, an opcode of the computer program instruction, or may be read from one or more registers associated with the computer program instruction. The values may comprise a rotation amount and/or a block size. The values may comprise one or more value from which the rotation amount and/or block size can be calculated by the execution unit.

According to a second aspect of the disclosure, there is provided a processing unit comprising the execution unit defined in the first aspect. The processing unit may be a tile processor. The processing unit may comprise local memory. The execution unit may receive the input data block from the local memory.

According to a third aspect of the disclosure, there is provided a processing device comprising the processing unit defined in the second aspect. The processing device may comprise a plurality of processing units. At least one of the processing units may comprise the execution unit. The processing units may communicate via an exchange fabric which implements a time deterministic exchange.

According to a fourth aspect of the disclosure, there is provided a method implemented in an execution unit, the method comprising:
  receiving an input data block comprising N bytes;
  supplying first layer data blocks comprising a respective subset of bytes of the input data block to a first and second first layer multiplexer array;
  supplying a first layer control signal to the first and second first layer multiplexer array;
  rotating the first layer data blocks by an amount indicated by the control signal to output a first rotated first layer data block and a second rotated first layer data block;
  supplying the first rotated first layer data block and the second rotated first layer data block to a second layer multiplexer array, the second layer multiplexer array comprising N multiplexers,
  supplying a second control signal to the second layer multiplexer array to select between a corresponding byte of the first and second rotated first layer data blocks based on the second control signal.

Further optional features of the method of the fourth aspect are defined hereinabove in relation to the first, second and third aspect, and may be combined in any combination.

BRIEF DESCRIPTION OF THE DRAWINGS

For a better understanding of the present invention and to show how the same may be carried into effect, reference will now be made by way of example only to the accompanying drawings, in which:

FIG. 9 is an example code sample illustrating a pack instruction, and

FIG. 10 is an example code sample illustrating an extract instruction.

Figure 1A:
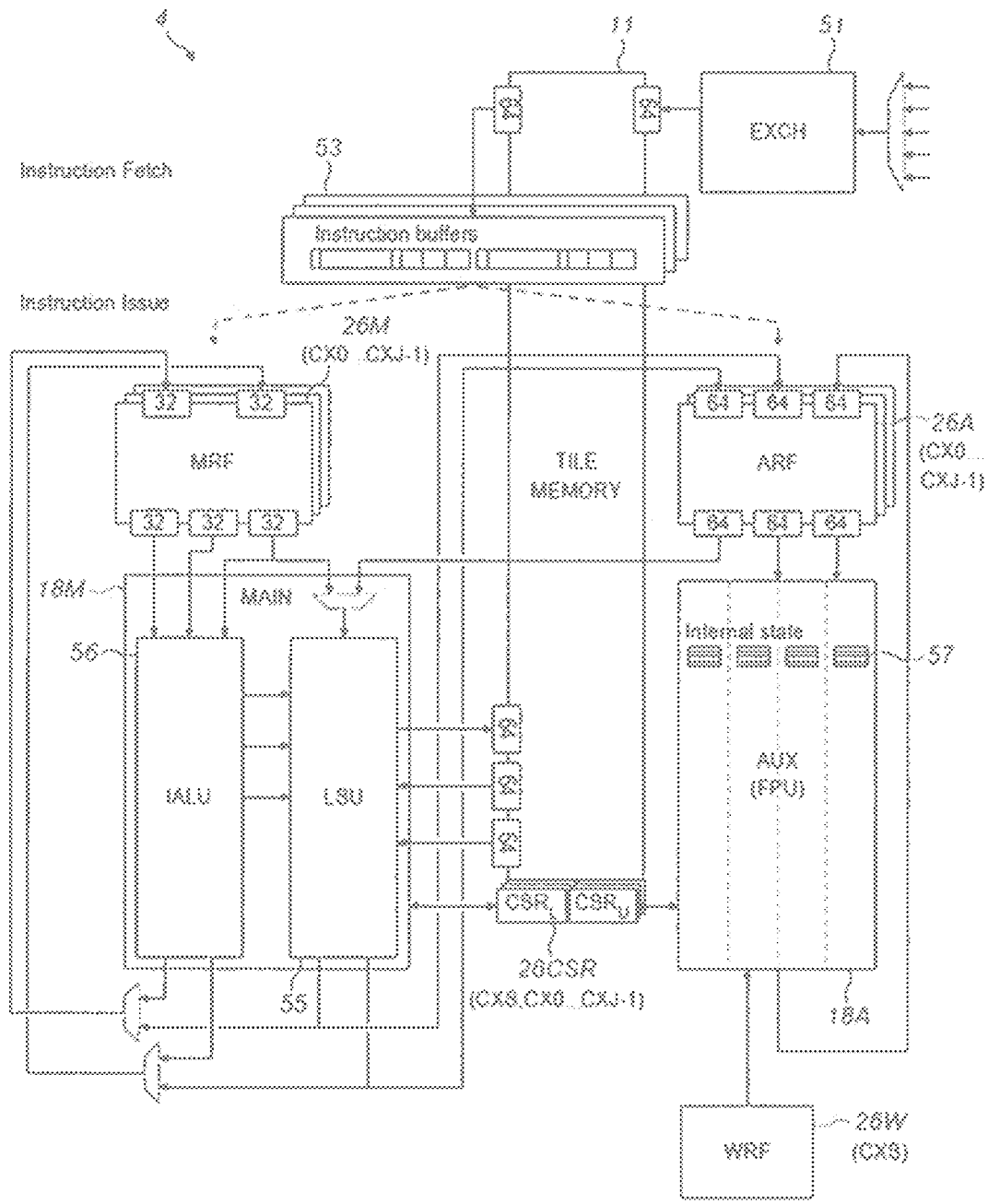
FIG. 1A is a schematic block diagram of a processor in which examples of the disclosure are implemented.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various examples. Also, common but well-understood elements that are useful or necessary in a commercially feasible example are often not depicted in order to facilitate a less obstructed view of these various examples.

DETAILED DESCRIPTION OF EXAMPLES

In overview, examples of the disclosure provide a logic circuit for performing byte-wise rotation of data blocks. The logic circuit is logically arranged in layers, wherein each layer is configured to perform operations on blocks of successively larger sizes. The results of the previous layer provide input to a subsequent layer, so that results of smaller block rotations are used as partial results for the computation of larger block rotation. In some examples, the logic circuit is incorporated into a processing unit of a processing device, such as a tile processor of a processor having multiple tiles, for example in the execution unit thereof.

Advantageously, the examples of the disclosure provide a means of rotating blocks of relatively large sizes that avoids large multiplexer arrays with complex wiring. Accordingly, smaller and faster multiplexers are employed, and the need for large quantities of long data path wires is obviated. This in turn helps keep timing paths short. Furthermore, the examples herein assist in minimising the area cost of processor features, by employing hardware resources that are reused across all sizes of rotate operation, rather than requiring different hardware resources for different block sizes.

Examples are implemented in a processing unit, which may take the form of a processor 4, which is described in more detail with reference to FIG. 1A. In some examples, the processor 4 may take the form of a tile 4 of a multi-tile processing device. An example of such a multiple tile processing device is described in more detail in our earlier application US patent application US 2020/0319861 A1, which is incorporated by reference.

Reference is made to FIG. 1A, which illustrates an example of the processor 4 including detail of the execution unit 18 and context registers 26. The processor 4 shown includes a weights register file 26W, and so may be specially adapted for machine learning applications, in which machine learning models are trained by adjusting the weights for those models. However, examples of the application are not limited to machine learning applications but are more broadly applicable. Furthermore, the processor 4 described is a multi-threaded processor capable of executing M thread concurrently. The processor 4 is able to support execution of M worker threads and one supervisor thread, where the worker threads perform arithmetic operations on data to generate results and the supervisor thread co-ordinates the worker threads and control the synchronisation, sending and receiving functionality of the processor 4.

The processor 4 comprises a respective instruction buffer 53 for each of M threads capable of being executed concurrently. The context registers 26 comprise a respective main register file (MRF) 26M for each of M worker contexts and a supervisor context. The context registers further comprise a respective auxiliary register file (ARF) 26A for at least each of the worker contexts. The context registers 26 further comprise a common weights register file (WRF) 26W, which all the currently executing worker thread can access to read from. The WRF may be associated with the supervisor context in that the supervisor thread is the only thread that can write to the WRF. The context registers 26 may also comprise a respective group of control state registers 26CSR for each of the supervisor and worker contexts. The execution unit 18 comprises a main execution unit 18M and an auxiliary execution unit 18A. The main execution unit 18M comprises a load-store unit (LSU) 55 and an integer arithmetic logic unit (IALU) 56. The auxiliary execution unit 18A comprises at least a floating point arithmetic unit (FPU).

In each of the J interleaved time slots S0 . . . SJ−1, the scheduler 24 controls the fetch stage to fetch at least one instruction of a respective thread from the instruction memory 11, into the respective one of the J instruction buffers 53 corresponding to the current time slot. In examples, each time slot is one execution cycle of the processor, though other schemes are not excluded (e.g. weighted round-robin). In each execution cycle of the processor 4 (i.e. each cycle of the processor clock which clocks the program counter) the fetch stage 14 fetches either a single instruction or a small "instruction bundle" (e.g. a two-instruction bundle or four-instruction bundle), depending on implementation. Each instruction is then issued, via the decode stage 16, into one of the LSU 55 or IALU 56 of the main execution unit 18M or the FPU of the auxiliary execution unit 18A, depending on whether the instruction (according to its opcode) is a memory access instruction, an integer arithmetic instruction or a floating point arithmetic instruction, respectively. The LSU 55 and IALU 56 of the main execution unit 18M execute their instructions using registers from the MRF 26M, the particular registers within the MRF 26M being specified by operands of the instructions. The FPU of the auxiliary execution unit 18A performs operations using registers in the ARF 26A and WRF 26W, where the particular registers within the ARF are specified by operands of the instructions. In examples the registers in the WRF may be implicit in the instruction type (i.e. pre-determined for that instruction type). The auxiliary execution unit 18A may also contain circuity in the form of logical latches internal to the auxiliary execution unit 18A for holding some internal state 57 for use in performing the operations of one or more of the types of floating point arithmetic instruction.

In examples that fetch and execute instructions in bundles, the individual instructions in a given instruction bundle are executed simultaneously, in parallel down independent pipelines 18M, 18A (shown in FIG. 1A). In examples that execute bundles of two instructions, the two instructions may be executed simultaneously down respective auxiliary and main pipelines. In this case, the main pipeline is arranged to execute types of instruction that use the MRF and the auxiliary pipeline is used to execute types of instruction that use the ARF. The pairing of instructions into suitable complementary bundles may be handled by the compiler.

Each worker thread context has its own instance of the main register file (MRF) 26M and auxiliary register file (ARF) 26A (i.e. one MRF and one ARF for each of the barrel-threaded slots). Functionality described herein in relation to the MRF or ARF is to be understood to operate on a per context basis. However there is a single, shared weights register file (WRF) shared between the threads. Each thread can access the MRF and ARF of only its own context 26. However, all currently-running worker threads can access the common WRF. The WRF thus provides a common set of weights for use by all worker threads. In examples only the supervisor can write to the WRF, and the workers can only read from the WRF.

The instruction set of the processor 4 includes at least one type of load instruction whose opcode, when executed, causes the LSU 55 to load data from the data memory 22 into the respective ARF, 26A of the thread in which the load instructions was executed. The location of the destination within the ARF is specified by an operand of the load instruction. Another operand of the load instruction specifies an address register in the respective MRF, 26M, which holds a pointer to an address in the data memory 22 from which to load the data. The instruction set of the processor 4 also includes at least one type of store instruction whose opcode, when executed, causes the LSU 55 to store data to the data memory 22 from the respective ARF of the thread in which the store instruction was executed. The location of the source of the store within the ARF is specified by an operand of the store instruction. Another operand of the store instruction specifies an address register in the MRF, which holds a pointer to an address in the data memory 22 to which to store the data. In general the instruction set may include separate load and store instruction types, and/or at least one load-store instruction type which combines the load and store operations in a single instruction.

In response to the opcode of the relevant type of arithmetic instruction, the arithmetic unit (e.g. FPU) in the auxiliary execution unit 18A performs an arithmetic operation, as specified by the opcode, which comprises operating upon the values in the specified source register(s) in the threads' respective ARF and, optionally, the source register(s) in the WRF. It also outputs a result of the arithmetic operation to a destination register in the thread's respective ARF as specified explicitly by a destination operand of the arithmetic instruction.

The processor 4 may also comprise an exchange interface 51 for exchanging data between the memory 11 and one or more other resources, e.g. other instances of the processor and/or external devices such as a network interface or network attached storage (NAS) device. As discussed above, in examples the processor 4 may form one of an array of interconnected processor tiles, each tile running part of a wider program. The individual processors 4 (tiles) thus form part of a wider processor or processing system 6. The tiles 4 may be connected together via an interconnect subsystem, to which they connect via their respective exchange interface 51. The tiles 4 may be implemented on the same chip (i.e. die) or on different chips, or a combination (i.e. the array may be formed from multiple chips each comprising multiple tiles 4). The interconnect system and exchange interface 51 may therefore comprise an internal (on-chip) interconnect mechanism and/or external (inter-chip) exchange mechanism, accordingly.

Figure 2:
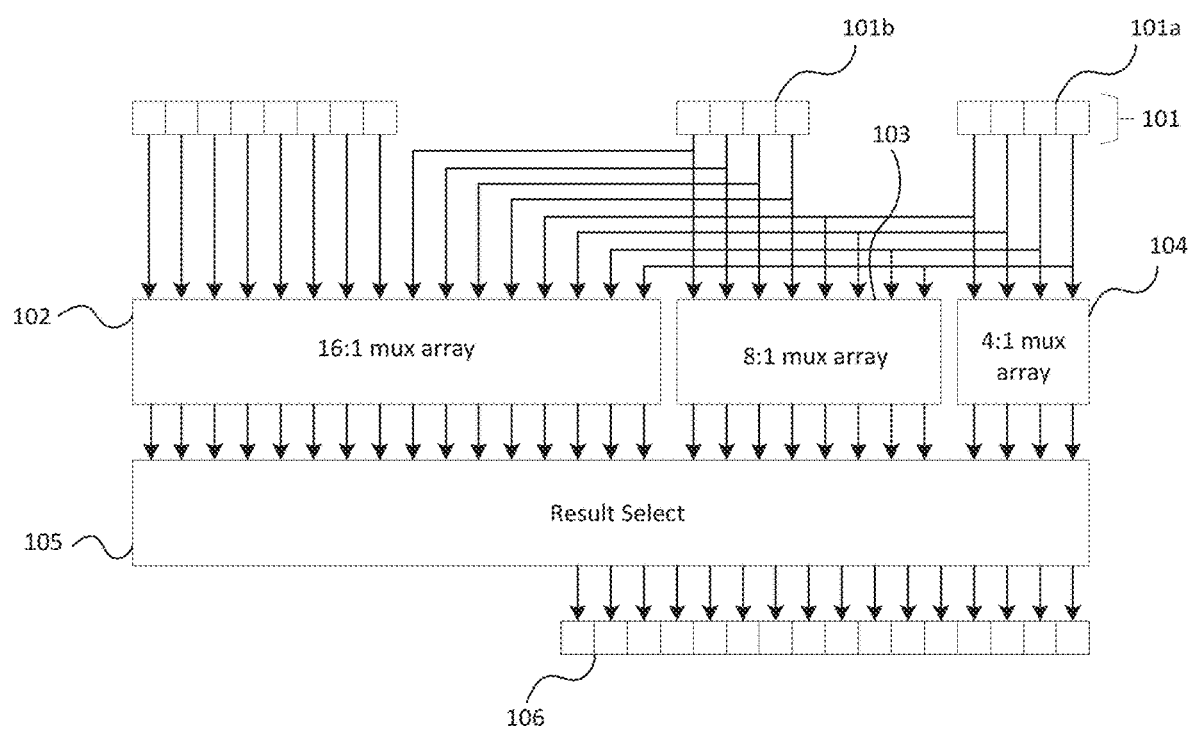
FIG. 2 is a schematic block diagram of a simple example logic circuit.

FIG. 2 illustrates a simple logic circuit 100 for performing a data block rotation operation not falling within the scope of the claims.

The logic circuit 100 is configured to rotate input data blocks that are either 4, 8 or 16 bytes in size. The logic circuit has an input data array 101 of 16 bytes. In the event that rotation of a 4 byte block is required, a subset 101a of the input data array 101 receives the 4 byte block. In the event that rotation of an 8 byte block is required, the subset 101a is used for 4 of the 8 bytes, and another subset 101b is used for the remaining 4 bytes.

The logic circuit comprises a 16:1 multiplexer array 102, an 8:1 multiplexer array 103, and a 4:1 multiplexer array 104. Each of the multiplexer arrays receives a block of the respective size S, and a control signal (not shown) indicating a rotate amount. The rotate amount represents the number of bytes by which the block is to be rotated.

The arrays 102-104 each comprise a series of S multiplexers, where input j of each multiplexer i is connected to byte (i+j)mod S of the input data array. Accordingly, $0^{th}$ input of a $0^{th}$ multiplexer of a the 4:1 array 104 is connected to byte (0+0)% 4=0 of the input data array, $1^{st}$ input is connected to (0+1)% 4=1, and so on. The $0^{th}$ input of a $1^{st}$ multiplexer of the 4:1 array 104 is connected to byte (1+0)% 4=1, the $1^{st}$ input of a $1^{st}$ multiplexer is connected to byte (1+1)% 4=2 and so on for all the inputs of all of the multiplexers in the array. "%" and "mod" in this context are both a short hand for the modulo operator. Accordingly, by arranging the input in this manner, the control signal can be applied to each multiplexer in the array to select the relevant bytes from the input data array to cause the desired rotation.

Herein, in some contexts such as where arrays of data or multiplexer arrays are discussed, the convention of indexes beginning with 0 is followed. Accordingly, the $0^{th}$ element of an array may be the element appearing first in said array, the $1^{st}$ element may be the element appearing second and so on. In other contexts, the terms first, second, third etc may either be simply used as labels to differentiate between like elements. It will be apparent from the relevant context as to the meaning intended.

A result multiplexer array 105 is then used to select the results from the relevant S:1 array 102-104 to provide the results 106, again based on another suitable control signal, referred to as the select signal. For example, the lowest log 2(S) bits of the rotate amount may be used as the select signal.

Whilst this approach is simple, the use of large multiplexers for large block sizes may be too slow to fit in to the timing constraints of a relatively short processor clock period. In addition, a large number of long wires are required to connect the multiplexer inputs, creating routing congestion. It will be appreciated that the difficulties in meeting the timing constraints may be influenced to some degree by the amount of logic and available timing slack before and/or after the circuit 100, as well as other constraints related to the placement of the circuit 100 in the processing unit and routing congestion within the processing unit. Furthermore, the wiring for each of the initial multiplexer arrays 102-104 supports only a single fixed block size.

Figure 3:
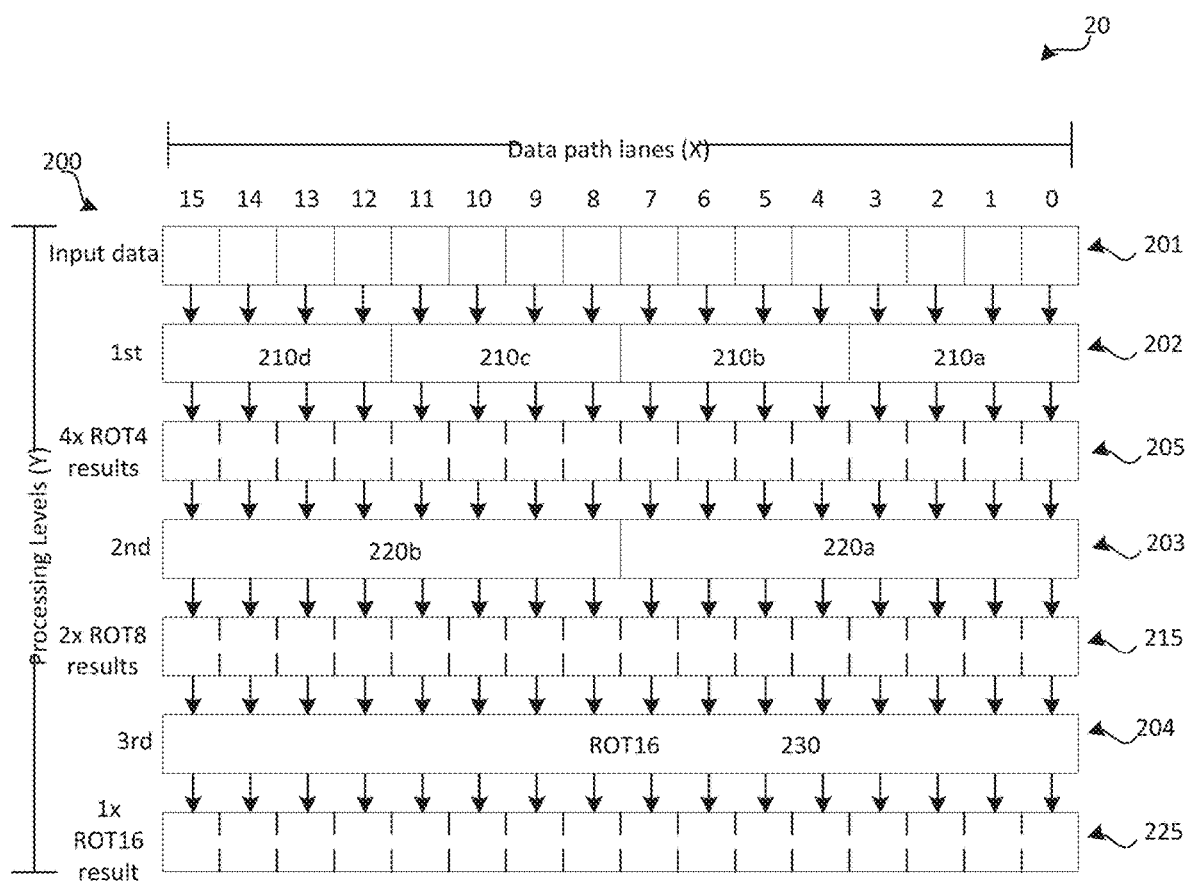
FIG. 3 is a schematic block diagram of an example logic circuit of the present disclosure.

FIG. 3 illustrates an improved logic circuit 20 in accordance with an example of the disclosure. The logic circuit 20 comprises circuitry 200 configured to carry out rotation operations for each of 16, 8 and 4 byte blocks.

The logic circuit comprises an input data array 201, configured to receive a data block of either 16, 8 or 4 bytes to be rotated. Each input byte of the input data array 201 can be considered a data "lane".

The circuitry 200 is arranged into a plurality of processing levels, 202, 203, 204. Each level is configured to compute rotations in relation to successively larger block sizes (4, 8, 16). The first level 202 operates on the input data array 201. The subsequent levels 203, 204 operate on the output from the preceding level as partial results.

Accordingly, a rotation operation for a larger block size is effectively decomposed across the plurality of processing levels 202-204. It will be understood that the "levels" in this context are a construct used to discuss the logical arrangement of the components of the circuit 200, and do not imply any particular physical layout of the circuitry 200.

The first processing level 202 comprises four rotators 210a-d. Each rotator 210 is configured to compute a rotation of a 4-byte block. Accordingly, each rotator 210 is connected to a different respective 4 bytes of the input data array 201. For example, rotator 210a is connected to bytes 0-3 of the array 201, rotator 210b is connected to bytes 4-7, and so on. Each rotator 210 provides its outputs to corresponding bytes of a first intermediate results array 205. That is to say that the rotator 210a is connected to bytes 0-3 of the first intermediate results array 205, rotator 211b is connected to bytes 4-7, and so on. Consequently, the first processing level 202 effectively comprises four parallel 4-byte rotators, each operating on 4 data lanes of the input array.

Figure 4:
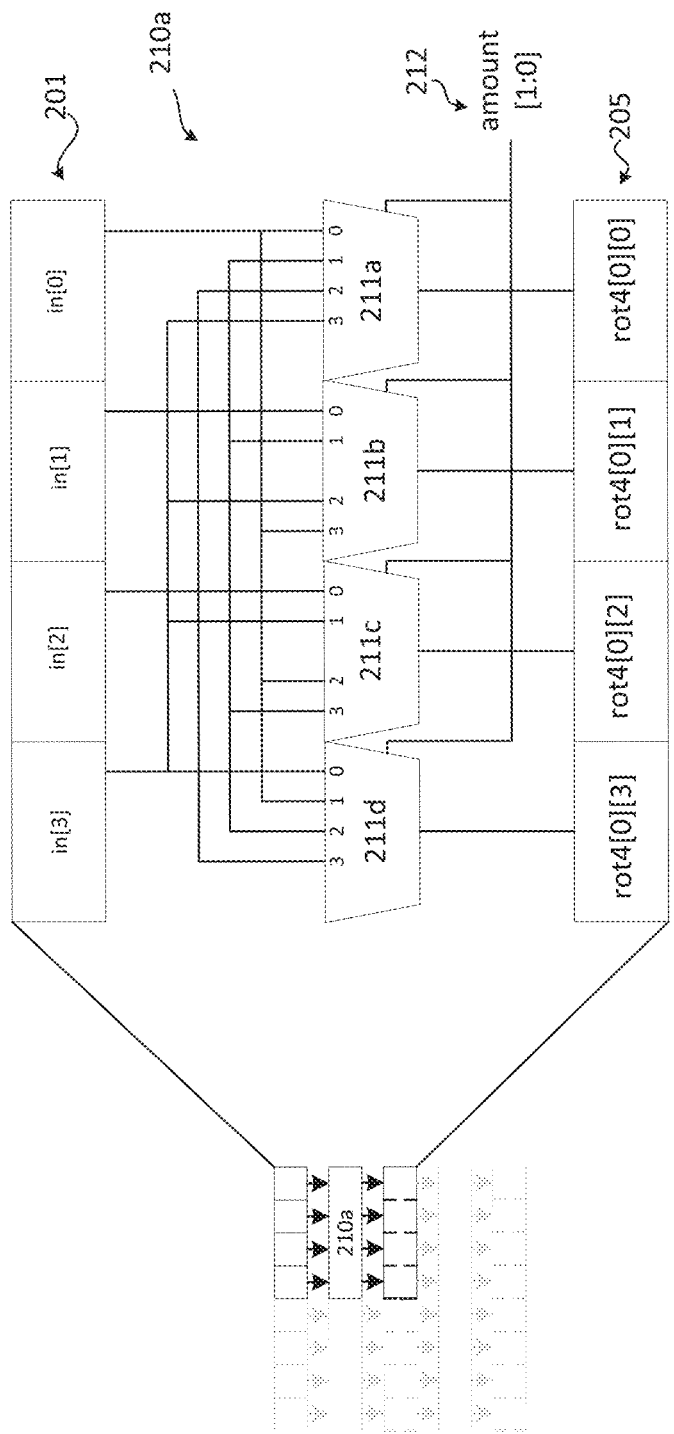
FIG. 4 is a schematic block diagram showing a first processing level of the example logic circuit of FIG. 3 in more detail.

FIG. 4 illustrates the structure and operation of a rotator 210a of the first processing level 202 in detail. The rotator 210a takes the form of a multiplexer array comprising four multiplexers 211a-d. Each multiplexer 211 has 4 inputs, connected to the 4 respective bytes forming the subset of the input data array 201 on which the rotator 210a operates.

The multiplexer array operates in the same manner as the 4:1 array discussed above with respect to FIG. 2, with input j of each multiplexer i connected to byte (i+j)mod 4 of the respective 4 byte subset of the input data array 201 to which the rotator 210a is connected. Accordingly, $0^{th}$ input of multiplexer 211a (i.e. the $0^{th}$ multiplexer) is connected to byte (0+0)% 4=0 of the input data array, $1^{st}$ input is connected to (0+1)% 4=1, and so on. The $0^{th}$ input of multiplexer 211b (i.e. $1^{st}$ multiplexer) is connected to byte (1+0)% 4=1, the $1^{st}$ input of a $1^{st}$ multiplexer is connected to byte (1+1)% 4=2 and so on for all the inputs of all of the multiplexers in the array.

The output of each multiplexer 211 in the array is provided to the corresponding byte of the first intermediate results array 205. That is to say, the $0^{th}$ multiplexer 211 is connected to byte 0 of the intermediate results array 205, the $1^{st}$ multiplexer 211 is connected to byte 1 of the intermediate results array 205, and so on.

The rotator 210a is configured to receive a control signal 212, indicating the amount of desired rotation. For example, the control signal 212 may comprise a 2-bit signal, representing a rotation amount of 0 to 3 (i.e. up to the block size −1). The control signal 212 is provided to each multiplexer 211, which selects the input corresponding to the rotation amount. This causes each multiplexer in the array to select the relevant bytes from the input data array to cause the desired rotation. If the rotation amount is 0, the multiplexer array acts as a pass through.

The rotators 210b-d operate substantially identically, other than receiving input from and providing output to different bytes of the input array 201 and intermediate results array 205.

In terms of expressing the relationship between a given multiplexer 211 of any of rotators 210 to the full input data array 201, input j of the $i^{th}$ S:1 multiplexer should be connected to the following byte of the input data array 201:

$$(\text{floor}(i/S) * S) + (j \% S)$$

In the above formula i is the index of the multiplexer 211 in the whole first processing level 202, such that multiplexers 211a-d of the rotator 210a are indexed 0-3, multiplexers 211 of rotator 210b are indexed 4-7 and so on.

Returning to FIG. 3, the second processing level 203 comprises two 8-byte rotators 220a,b. The 8-byte rotators are each connected to a different 8 bytes of the first intermediate results array 205. For example rotator 220a receives input from bytes 0-7 of the array 205 and rotator 220b receives input from bytes 8-15 of the array 205. Each rotator 220a outputs a rotated 8-byte block to a second intermediate results array 215. Accordingly, the rotators 220a generate a rotated 8-byte block (i.e. rotated with respect to the corresponding 8 bytes of input array 201) from the two rotated four byte blocks output by the first level 202.

Figure 5:
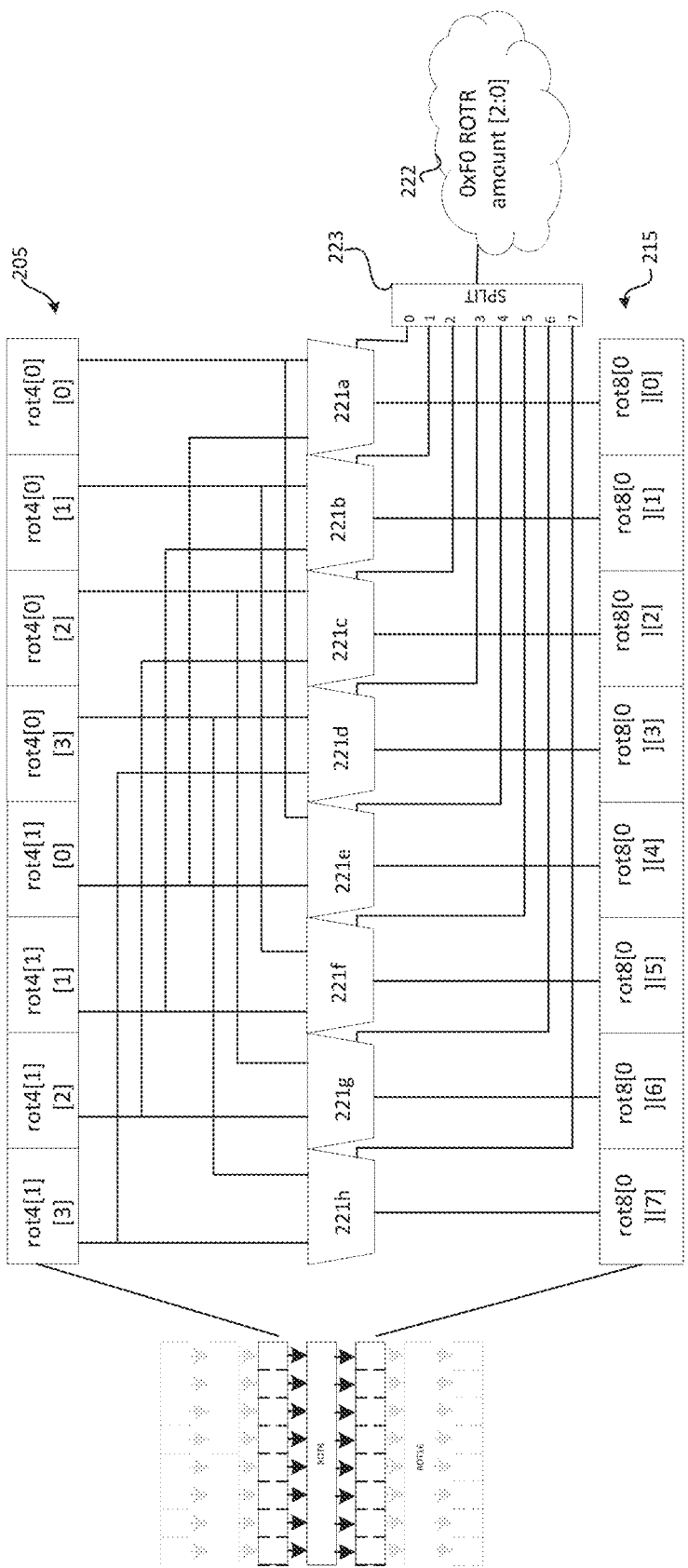
FIG. 5 is a schematic block diagram showing a second processing level of the example logic circuit of FIG. 3 in more detail.

FIG. 5 illustrates the rotator 220a of the second processing level 203 in more detail. The rotator takes the form of an array of 8 multiplexers 221a-h.

Each multiplexer is a 2:1 multiplexer. Input 0 of the $i^{th}$ multiplexer is connected to byte i mod 4 of the array 205. Input 1 of the $i^{th}$ multiplexer is connected to byte (i mod 4)+4 of the array 205. Accordingly, each multiplexer 221 effectively selects between a corresponding byte of the first rotated block (i.e. output from rotator 210a to bytes 0-3 of the array 205) or the second rotated block (i.e. output by rotator 210b to bytes 4-7 of the array 205), with input 0 connected to the byte of first rotated block and input 1 to the byte of the second rotated block.

The output of each multiplexer 221 in the array is provided to the corresponding byte of the second intermediate results array 215. That is to say, the $0^{th}$ multiplexer 221 is connected to byte 0 of the intermediate results array 215, the $1^{st}$ multiplexer 221 is connected to byte 1 of the intermediate results array 215, and so on.

The rotator 220a is configured to receive a control signal 222. The control signal 222 takes the form of an 8-bit bitmask 0xF0 (i.e. 11110000), rotated by an amount corresponding to the desired rotation amount. The desired rotation amount is a value between 0-7. Accordingly, for a rotation amount of 1, the bitmask will be 11100001, for a rotation amount of 2, the bitmask will be 11000011 and so on.

The bitmask is split by splitter 223, such that each bit of the bitmask of the control signal 222 is directed to a respective multiplexer 221. In other words, bit 0 of the bitmask is provided to $0^{th}$ multiplexer 221a, bit 1 of the bitmask is provided to $1^{st}$ multiplexer 221b and so on. The splitter 223 may comprise suitable circuitry, and may for example comprise wiring to carry each of the bits to their respective multiplexer 221. In some examples, the splitter 223 may be embodied by wiring alone.

Accordingly, the rotator 220a takes two 4-byte blocks that have been rotated by an arbitrary amount, and outputs an 8 byte block that has been rotated by the same arbitrary amount. If the rotation amount is 0 (i.e. the bitmask is 11110000), the rotator 220a acts as a pass through.

The rotator 220b operates substantially identically, other than receiving input from and providing output to different bytes of the first intermediate results array 201 and second intermediate results array 215.

Returning to FIG. 3, the third processing level comprises a 16-byte rotator 230. The rotator 230 takes as input all 16 bytes of the second intermediate results array 215, which comprise two rotated 8-byte blocks output by rotators 220. The rotator 230 outputs a rotated 16-byte block to final results array 225.

Figure 6:
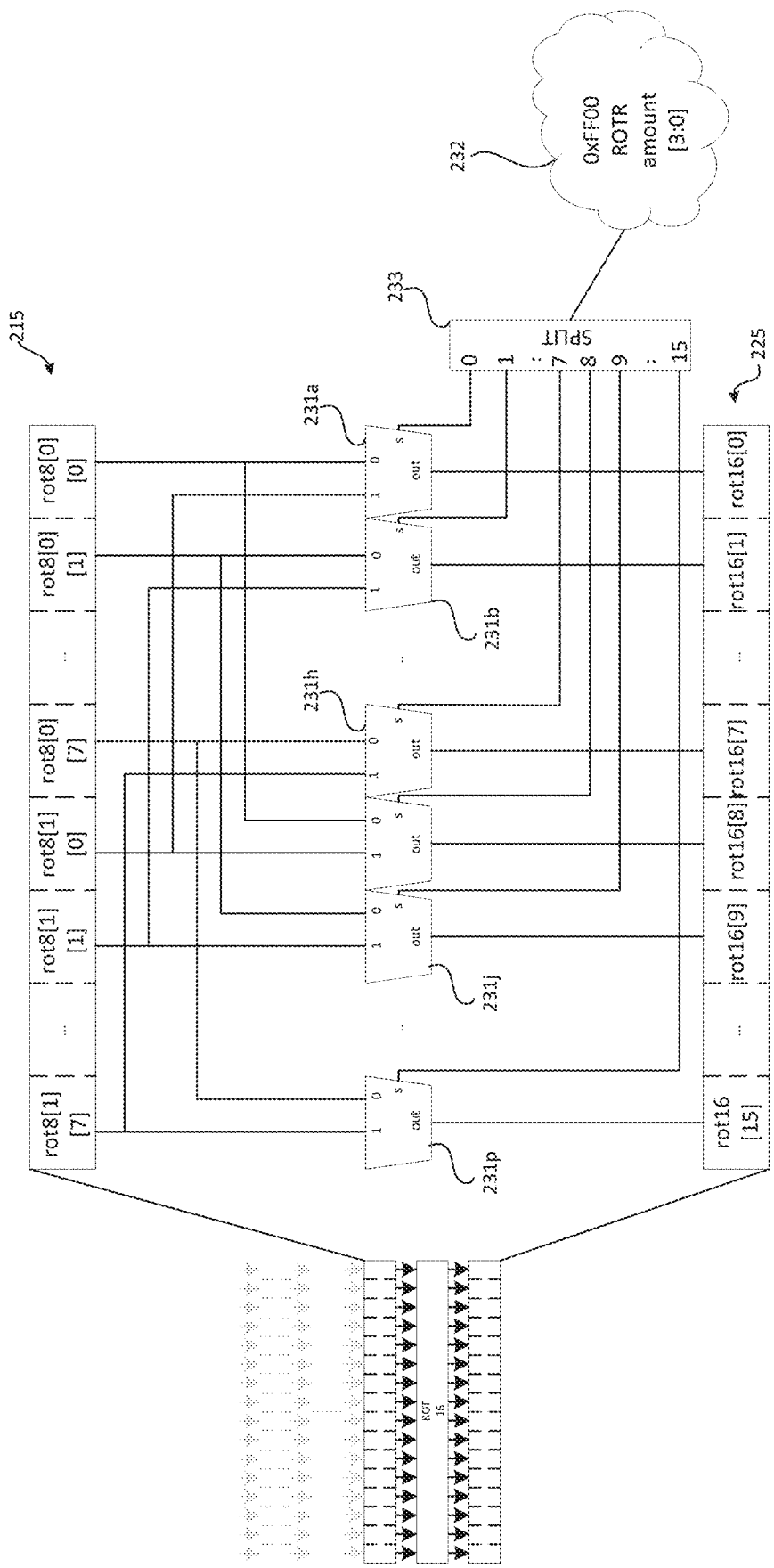
FIG. 6 is a schematic block diagram showing a third processing level of the example logic circuit of FIG. 3 in more detail.

FIG. 6 illustrates the rotator 230 in more detail. Again, the rotator 230 takes the form of a multiplexer array, in this case comprising 16 2:1 multiplexers 231a-p. Some of the multiplexers 231 have been omitted to improve the clarity of the figure.

The structure and operation of the rotator 230 is similar to the rotators 220, albeit adapted to operate on 8 byte input blocks rather 4 byte input blocks. Accordingly, input 0 of the $i^{th}$ multiplexer is connected to byte i mod 8 of the array 215. Input 1 of the $i^{th}$ multiplexer is connected to byte (i mod 8)+8 of the array 215. Accordingly, each multiplexer 231 effectively selects between a corresponding byte of the first rotated block (i.e. output from rotator 220a to bytes 0-7 of the array 215) or the second rotated block (i.e. output by rotator 220b to bytes 8-15 of the array 215), with input 0 connected to the byte of first rotated block and input 1 to the byte of the second rotated block.

Similarly to rotator 220, the rotator 230 is configured to receive a control signal in the form of a rotation of a bitmask. However, the bitmask is in this case a 16-bit bitmask 0xFF00. As before, the rotation of the bitmask reflects the desired rotation amount. The received bitmask is split by splitter 233 which distributes the bits of the bitmask to their respective multiplexers 230.

Figure 8:
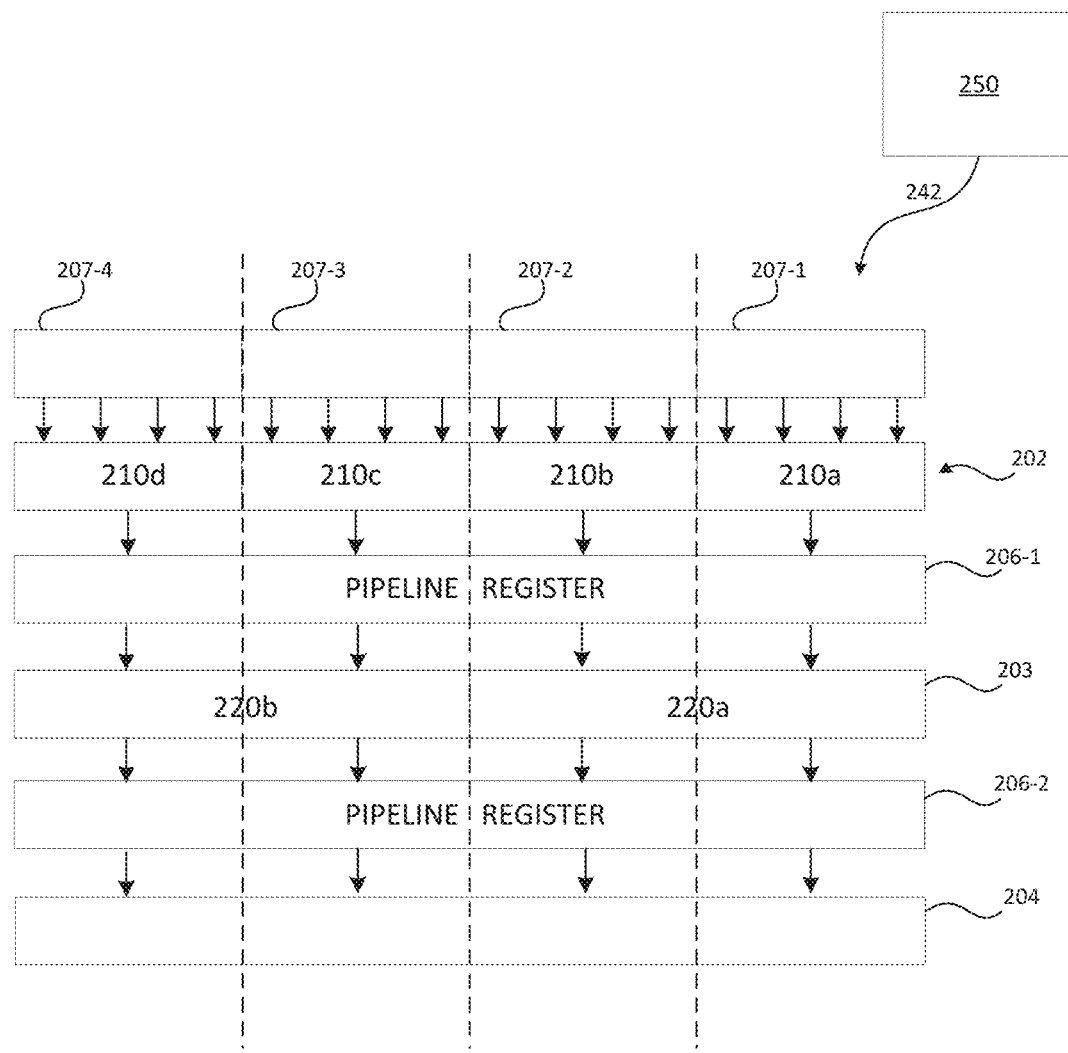
FIG. 8 is another schematic block diagram of the example logic circuit.

In some examples, the circuit 200 may comprise pipeline registers 206 disposed between at least some of the processing levels 202. These are illustrated in FIG. 8. This may assist in meeting timing requirements.

Figure 7:
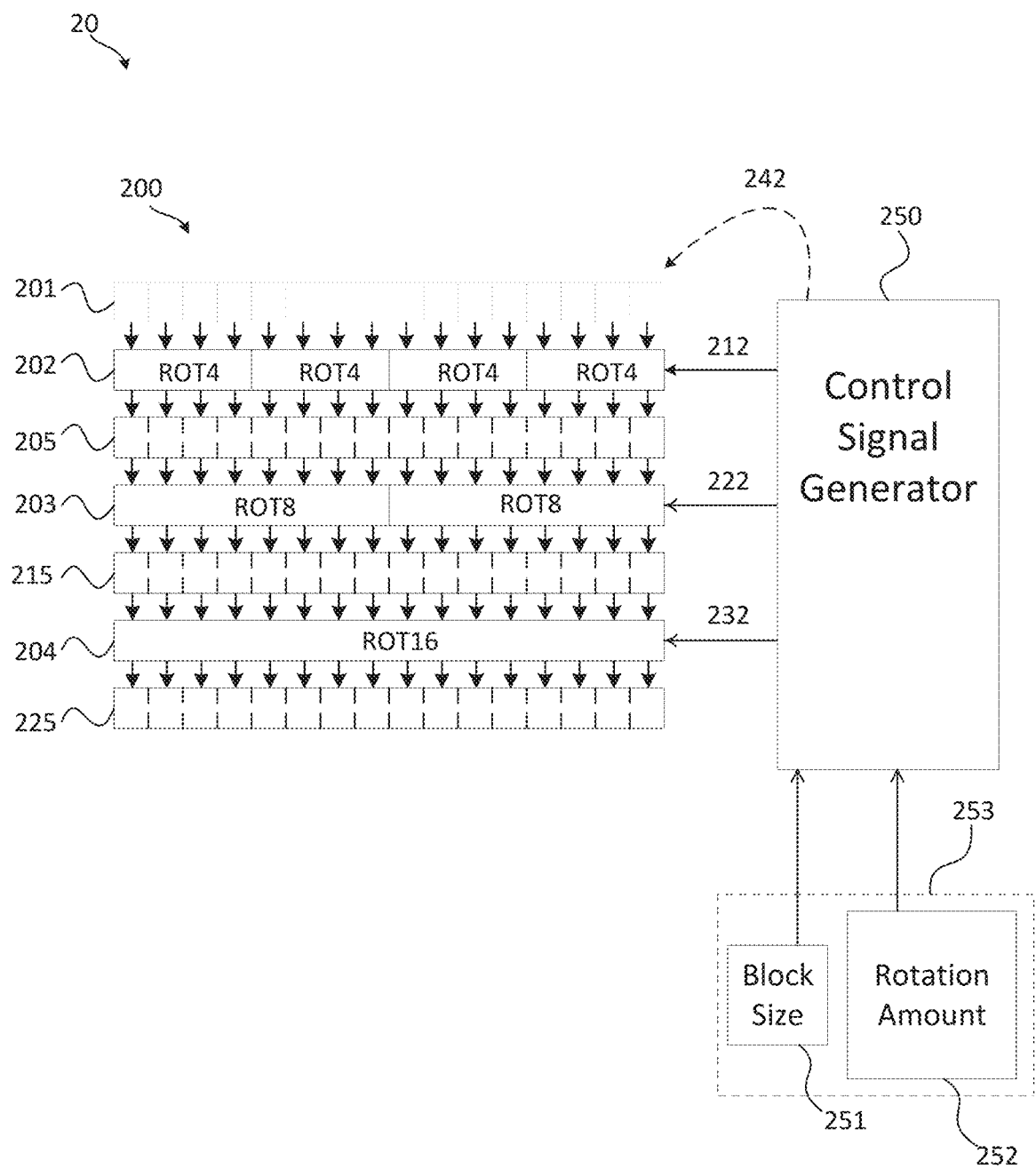
FIG. 7 is another schematic block diagram of the example logic circuit.

FIG. 7 illustrates that the logic circuit 20 may further comprise a control signal generator 250, comprising circuitry configured to generate the control signals 212, 222, 232 to control the rotators to perform the desired rotation. In order to generate such signals, the control signal generator may be provided with the size 251 of the block to be rotated, as well as the desired rotation amount 252.

As discussed in more detail below, these may form part of a rotate instruction 253, or may form part of another instruction that involves a rotation operation such as a pack or extract instruction. That is to say, the rotation amount 252 and block size 251 may be indicated by the instruction. For example, either or both of the rotation amount 252 and block size 251 may be operands or indicated by the opcode. In other examples, the rotation amount 252 and/or block size 252 or may be read from one or more registers as part of the execution of the instruction. It may also be the case that the instruction indicates a value from which the block size or rotation amount can be calculated.

As noted above, the control signal 212 for controlling the rotators 210 of the first level 202 is the desired rotation amount 252. For rotation of blocks having size 251 larger than 4 bytes by rotation amounts 252 larger than 3, the signal 212 is representative of the desired rotation amount mod 4.

As also noted above, the control signal 222 for controlling the rotators 220 of the second level 203 is the bitmask 0xF0 rotated by the rotation amount 252. Accordingly, the control signal generator 250 may comprise suitable circuitry for rotating the bitmask 0xF0 by the rotation amount 252. For example, the control signal generator 250 may comprise (or otherwise access) a lookup table storing rotated versions of the bitmasks. The control signal generator 250 may then select a stored rotated bitmask based on the desired rotation amount 252. In another example, the control signal generator 250 may comprise circuitry for carrying out bit shifting operations to rotate the bitmask by the desired amount. For rotation of blocks having size 251 larger than 8 bytes by rotation amounts 252 larger than 7, the bitmask is rotated by the rotation amount 252 mod 8.

As further noted above, the control signal 232 for controlling the rotator 230 of the third level is the bitmask 0xFF00 rotated by the rotation amount 252. Accordingly, the control signal generator 250 may also comprise similar circuitry to that described above in relation to the rotation of the bitmask 0xF0 for carrying out this rotation, such as a suitable lookup table or bit shifting circuitry.

To further facilitate understanding of the operation of the logic circuit 20, examples of the circuit 20 in use will now be discussed.

In order to rotate a 4-byte block, the 4-byte block is provided as input in bytes 0-3 of the input data array 205. The control signal generator 250 generates a control signal 212 corresponding to the desired rotation amount, which is provided to rotator 210a. The rotator 210a carries out the rotation, the results of which are output to bytes 0-3 of intermediate results array 205.

As only rotation of a 4-byte block is required, the control signal generator 250 generates unrotated bitmasks as control signals 222, 232 for levels 203, 204, causing them to act as passthroughs. Accordingly, the rotated block in bytes 0-3 of the intermediate results array 201 are passed through levels 203, 204 and output to bytes 0-3 of the output array 225. Generally, when one level is to act as a passthrough, the subsequent levels will also be made to act as passthroughs.

If desired, the logic circuit 20 can carry out rotation of up to four 4-byte blocks in parallel, by inputting respective 4-byte blocks to respective rotators 210 via the relevant bytes of the input data array 201.

Equally, if fewer than four 4-byte blocks are to be rotated in parallel, circuitry not used for the desired rotation may be disabled using clock gating. For example, if only one 4-byte block is rotated, the rotators 210b-d and 220b may be disabled. The control signal generator 250 may according generate suitable control signals 242 for enabling or disabling clock gates 207 (see FIG. 8) that may be included in the circuit 200.

In order to rotate an 8-byte block, the 8-byte block is provided as input in bytes 0-7 of the input data array 205. The control signal generator 250 generates a control signal 212 from the instruction, based on the desired rotation amount, which is provided to rotators 210a and 210b. The rotators 210a and 210b carry out the rotation, the results of which are output to bytes 0-3 and 4-7 respectively of first intermediate results array 205.

The control signal generator 250 also generates a control signal 222 based on the desired rotation amount, which is provided to rotator 220a. The rotator 220a outputs the rotated 8-byte block to the second intermediate results array 215 in bytes 0-7.

The control signal generator 250 furthermore generates a control signal 232 for level 204, which causes the rotator 230 to act as a pass through. Accordingly, the rotated 8-byte block is output to bytes 0-7 of the output array 225.

In a similar manner as discussed above in relation to 4 byte-blocks, two 8-byte blocks can be rotated in parallel using the logic circuit 20. Furthermore, control signals 242 may provide clock gating control signals 242 to disable circuitry not used to rotate a single 8-byte block.

In order to rotate a 16-byte block, the 16-byte block is provided as input to the data array 205. The control signal generator 250 generates a control signal 212 based on the desired rotation amount, which is provided to rotators 210a-d. The rotators 210a-d carry out rotation of their respective 4-byte blocks, the results of which are output respectively to bytes 0-3, 4-7, 8-11 and 12-15 respectively of first intermediate results array 205.

The control signal generator 250 also generates a control signal 222 based on the desired rotation amount, which is provided to rotators 220a and 220b. The rotator 220a outputs a rotated 8-byte block to the second intermediate results array 215 in bytes 0-7. The rotator 220b outputs a rotated 8-byte block to the second intermediate results array 215 in bytes 7-15.

The control signal generator 250 also generates a control signal 232 based on the desired rotation amount, which is provided to rotator 230. The rotator 230 outputs the rotated 16-byte block to output array 225.

The examples discussed above may be incorporated into the processing units discussed above in relation to FIG. 1A. For example, the execution unit 18 of processor 4 may include the logic circuit 20. The circuit 20 may for example be implemented in the FPU 18A of the processor 4.

In more detail, the execution unit 18 may receive an instruction (i.e. a computer program instruction) that executes the rotation of a data block. In one example, the instruction is a rotate instruction, which has the sole purpose of rotating a data block. However, it may also be the case that another instruction is provided which involves data block rotation and along with additional processing of the rotated data block. That is to say that the instruction may comprise multiple operations, including a rotation operation to be carried out by the logic circuit As discussed above, the received instruction 253 indicates the block size 251 and the required rotation amount 252 (e.g. as operands, as part of the opcode, or to be read from a register as part of the execution of the instruction). Although not shown in FIG. 6, the instruction 253 may also include an indication of the memory location of the block to be rotated. This may take the form of an address or a pointer to a register storing an address. In other examples, the memory address storing the block to be rotated may be implicit. The instruction 253 may optionally include an indication of a memory location for storage of the rotated block. Similarly, this may comprise an address or a pointer to a register storing an address. Equally, it may be implicit in the instruction.

Upon receipt of the received instruction, the execution unit 18 loads the data block into the input data array 201. For example, the execution unit 18 may receive the instruction as discussed herein with respect to FIG. 1A. Particularly, the fetch stage 14 may fetch the instruction from the instruction memory 11, and then the instruction may be issued via the decode stage 16 to the execution unit 18.

Based on the required rotation amount 252, the control signal generator 250 generates suitable control signals 212, 222, 232 to control the circuitry 200. The data block is then processed through the circuitry 200, with the output being read from output array 225. If the instruction includes a memory location for storage of the rotated block, the rotated block may then be stored to that memory location.

FIG. 8 illustrates the inclusion of clock gates 207 and pipeline registers 206 in more detail. The input array and output arrays have been omitted in this figure for clarity.

The pipeline registers 206 are disposed between successive processing levels. For example, a first pipeline register 206-1 is located between the first processing level 202 and the second processing level 203. A second pipeline register 206-2 is located between the second processing level 203 and the third processing level 204. It will be appreciated that pipeline registers 206 may not be required in some implementations, or only one pipeline register 206 may be required. By providing a layered structure including the levels 202, 203, 204, the insertion of the pipeline registers 206 to retime the logic circuit 20 is made simpler. Furthermore, the pipeline registers 206 are shared across operations applied to different block sizes.

In some examples, one or both of the intermediate result arrays 205, 215 may comprise the pipeline registers 206. That is to say, the intermediate result array 205 and/or 215 are each pipeline registers 206 in some cases. However, in other examples, one or both of the intermediate result arrays 205, 215 may be wires. As discussed herein, whether the arrays 205 and 215 are pipeline registers or wires may depend on the timing requirements.

FIG. 8 further illustrates a plurality of clock gates 207. The clock gates 207 in this example are configured to disable one or more data path lanes of the logic circuit 20. For example, each gate 207 may be arranged to disable four lanes. In the example shown, a first clock gate 207-1 can disable lanes 0-3, a second clock gate 207-2 may disable lanes 4-7, a third clock gate 207-3 can disable lanes 8-11, and a fourth clock gate 207-4 may disable lanes 11-15.

Accordingly, in the event that only one 4-byte block is to be rotated, clock gates 207-2, 207-3, and 207-4 may disable their corresponding lanes. Similarly, if one 8-byte block is to be rotated, clock gates 207-3 and 207-4 may disable their corresponding lanes. In the event that a multiplexer has some of its lanes disabled, the remaining lanes may act as passthroughs.

It will be appreciated that this is one example of the configuration of the clock gates 207. In other examples, the gates 207 may disable more or fewer lanes (e.g. 2 or 8 lanes). Furthermore, in some examples the gates 207 may be arranged to disable particular multiplexers.

FIGS. 9 and 10 will now be discussed, which respectively illustrate a first code sample and second code sample of instructions including a rotate operation.

The rotation operation discussed above may find particular utility in a class of instructions referred to herein as data movement instructions. Data movement instructions may be used in the processor 4 to accelerate the movement of arbitrarily aligned data.

For example, it may be the case that the architecture of the execution unit imposes certain constraints on access to data in memory. Suppose that the execution unit is configured to execute load instructions for units of data that are four bytes wide. In this case, each load instruction may only load data from memory addresses that represent 4-byte subdivisions of the memory. For examples, if the starting address of the memory is 0x80000, a load instruction may cause four bytes of data to be loaded starting from memory address 0x80000 or may be used to cause four bytes of data to be loaded starting from memory address 0x80004. However, given the architectural constraints of the processing unit, it is not possible to load data starting from memory address 0x80002, since this memory address is not aligned with the size of the memory accesses. Similar constraints may apply to store operations. Such constraints may cause issues for example in "worker" programs (i.e. programs executed by the worker threads), which may be collectively used to process large batches of application data, for example in the training of machine learning models. Data movement instructions may be used to align misaligned data, and thus accelerate the processing of the application data.

Although discussed in more detail above with respect to FIG. 1, relevant aspects of an example processing pipeline are summarised below. Data movement instructions may be available in "worker" programs, which are used to collectively process large batches of application data. Worker programs are executed by a tile processor (e.g. processor 4, FIG. 1) in order, by a fixed length pipeline. The pipeline latency is hidden by keeping multiple worker threads resident per tile 4, and scheduling these in barrel-threaded fashion over a plurality of clock cycles.

In a first pipeline stage, the instruction fetch stage 14 fetches raw instruction words from the executable region of tile-coupled memory 11 into a local buffer 53 inside the tile 4.

In a second pipeline stage, decode logic (e.g. decode stage 16) converts the fetched instruction words into an internal data structure describing how the remainder of the pipeline must be controlled to execute the instruction. For data movement instructions, fields of this data structure will signal for the FPU of the auxiliary execution unit 18A (and the data movement pipeline within) to be enabled, describe the operation to be performed via an opcode, and provide source and destination operand addresses.

In a third stage, operands are read. For instructions using the logic circuit 20 discussed herein, operand addresses decoded from the instruction index a series of registers in the ARF 26A. The read operand data is presented to the data movement pipeline inside the FPU.

Over the next several stages, the data movement pipeline executes the instruction to process blocks of data (the operand data). A data movement instruction for example be a "pack" or "extract" operation, with for example a 4, 8 or 16 byte block size. The data blocks are the data operands read from the ARF 26A. The "pack" and "extract" operations may also be controlled by per-worker state registers as described below.

After executing the instruction, the output is written back to the ARF 26A, at locations specified in an operand of the instruction.

FIG. 9 illustrates a code sample to perform a pack instruction. The pack instruction copies an arbitrary sequence of consecutive bytes from a first block into an arbitrary position in a second block, with wrapping. The logic circuit 200 is used to align bytes of the first block to the correct output position. The rotation amount is derived from fields in a $PACK worker state register, used implicitly by pack instructions. According to the configuration of the $PACK worker state register, masking is used to select an arbitrary number of consecutive bytes from the second data block, or the rotated first data block.

In detail, reference numeral 91 indicates the loading of a first data block of 8 bytes into memory location $a0:1. Two Idconst instructions are used to load 4 bytes each of the block into $a0 and $a1. That is, the first operand of the Idconst instruction indicates the location into which the data is loaded, and the second operand indicates the data. In this example, the Idconst instruction is used to load the location $a0:1 with dummy data. In practice, it will be appreciated that the memory location will be loaded with application data.

Reference numeral 92 indicates corresponding instructions used to load a second data block into locations $a2:3.

Subsequently, the pack instruction is configured. In the example, the pack instruction is intended to insert 3 bytes from the first block at position one, into the second block at position 5. To this end, a register $m0 is set with a value reflective of the desired configuration, indicated by reference numeral 93. In the example, the setzi instruction is an instruction configured to set a register. The instruction takes a first operand indicative of the register ($m0), and a second operand comprising the value to be stored in the register.

In the example, the two least significant bytes (0x03) indicate the number of bytes to be inserted. The next two bytes (0x01) indicate the location in the first block those bytes are to be read from. The final byte (0x5) indicates the location in the second block at which the bytes are to be inserted.

This value is then copied from the register $m0 into the aforementioned $PACK worker state register, using the put instruction in step 94.

Finally, the pack instruction is executed, as indicated by reference numeral 95. The first operand indicates where the result of the instruction is to be output, with the second and third operands respectively indicating the locations in memory of the first and second blocks. Accordingly, in the example, the result is written back to $a0:1, the location from which the first block is read.

The opcode of the pack instruction indicates the block size. In the example, the opcode is "pack64", indicative of an 8 byte (i.e. 64 bit) block size. Different opcodes may be provided for different size blocks, such as pack128 for a 16 byte block and pack32 for a 4 byte block.

When the pack instruction is executed, the execution unit determines the required rotation amount based on the values in $PACK, and determines the block size to be rotated based on the opcode. Accordingly, the control signal generator 250 generates suitable control signals to configure the logic circuit to carry out the required rotation. In the example discussed above, the block size is 8, and the bytes of the first block are rotated by four, to match the output location.

FIG. 10 illustrates a code sample to perform an extract instruction. An extract instruction extracts an arbitrarily-positioned block of consecutive bytes from the concatenation of two input blocks, with wrapping. The $EXTRACT worker state register indicates a "pivot point", representing the starting index for selecting bytes from the concatenated double-length block. Masking is used to select relevant bytes from either input block. The resulting bytes are then rotated into the correct output position using the logic circuit 200.

In detail, reference numeral 1001 indicates the loading of a first data block of 16 bytes into memory location $a0:3. Four Idconst instructions are used to load 4 bytes each of the block into $a0 to $a3 respectively. Reference numeral 1002 indicates corresponding instructions used to load a second data block into locations $a4:7.

Reference numeral 1003 and 1004 indicate the setting of the $EXTRACT register with the value 0x7, reflective of the fact that the output is to be extracted starting at byte 7 of the concatenation of the two input blocks.

Reference numeral 1005 illustrates the execution of the extract operation. As with the pack instruction, the first operand indicates where the result of the instruction is to be output, with the second and third operands respectively indicating the locations in memory of the first and second blocks. Accordingly, in the example, the result is written back to $a0:3, the location from which the first block is read.

The opcode of the extract instruction also indicates the block size. In the example, the opcode is "extract128", indicative of a 16 byte (i.e. 128 bit) block size. Different opcodes may be provided for different size blocks, such as extract64 for an 8 byte block and extract32 for a 4 byte block.

When the extract instruction is executed, the execution unit determines the required rotation amount based on the value in $EXTRACT, and determines the block size to be rotated based on the opcode. Accordingly, the control signal generator 250 generates suitable control signals to configure the logic circuit to carry out the required rotation.

Both pack and extract instructions are discussed in more detail in co-pending U.S. patent application Ser. No. 18/053,948, the contents of which are incorporated herein by reference in their entirety.

Figure 1B:
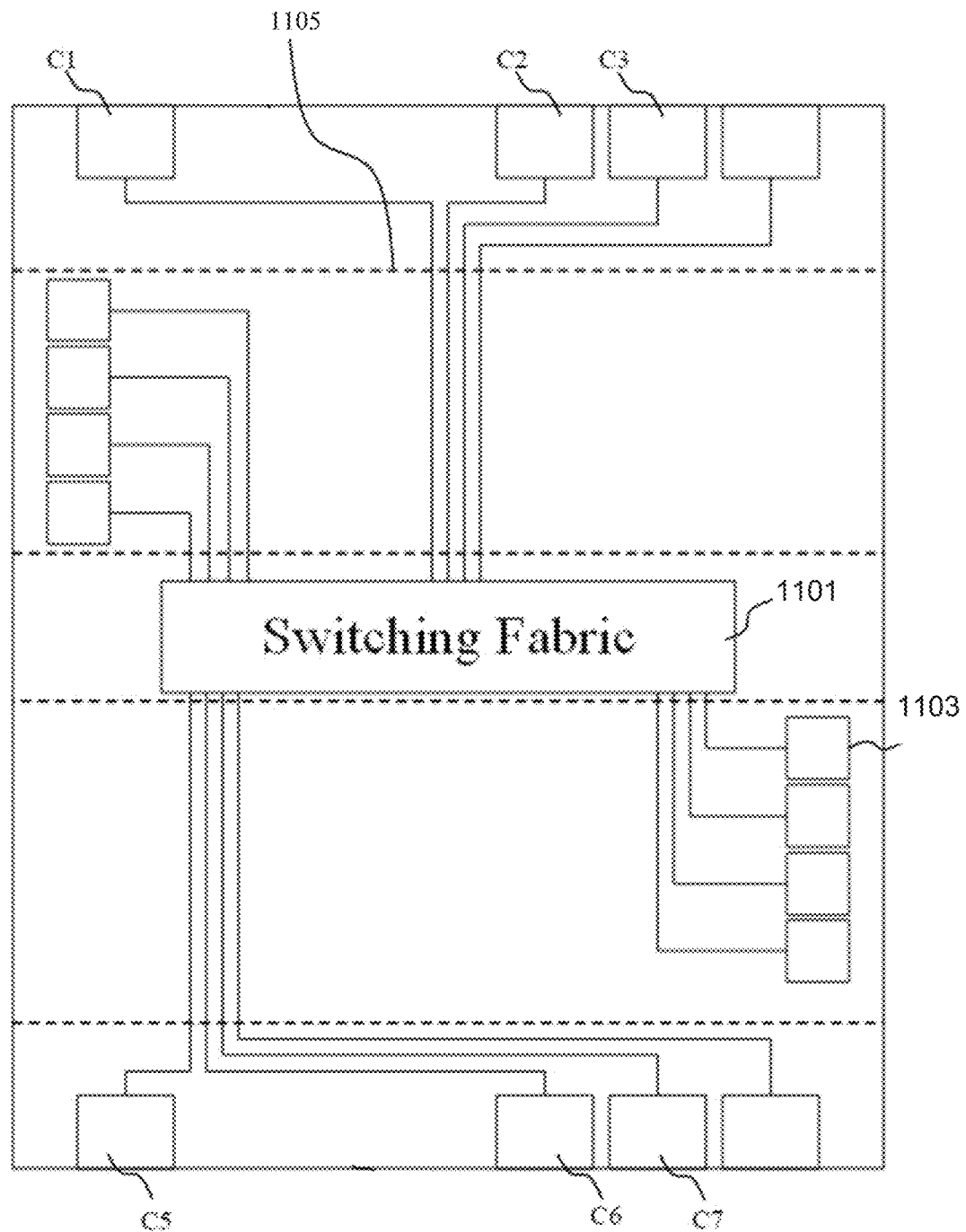
FIG. 1B is a schematic diagram of one example of a processor chip in which examples of the disclosure are implemented.

A further discussion of multi-tile processing units now follows. As discussed above, the processor 4 may form part of a multi-tile processing device. There are many possible different manifestations of a suitable processing device, which may take the form of a chip. Graphcore have developed an intelligence processing unit (IPU) which is described for example in US patent applications numbers: US 2019/0121387 A1; US 2019/0121388 A1; US 2019/0121777 A1; US 2020/0319861 A1 the contents of which are herein incorporated by reference. FIG. 1B is a highly schematic diagram of an IPU. The IPU comprises a plurality of tiles 1103 on a silicon die, each tile comprising a processing unit (e.g. the processing unit 4 described above) with local memory. The tiles communicate with each other using a time deterministic exchange. A switching fabric 1101 (sometimes referred to as an exchange or exchange fabric) is connected to each of the tiles by the respective sets of output wires and connectable to each of the tiles by their respective sets of input wires via switching circuitry controllable by each tile. A synchronisation module (not shown) is operable to generate a synchronisation signal to switch between a compute phase and an exchange phase. The tiles execute their local programs in the compute phase according to a common clock which may be generated on the die or received by the die. At a predetermined time in the exchange phase, a tile may execute a send instruction from its local program to transmit a data packet onto its output set of connection wires, the data packet being destined for at least one recipient tile but having no destination identifier identifying that recipient tile. At a predetermined switch time, the recipient tile executes a switch control instruction from its local program to control the switching circuitry to connect its inputs set of wires to the switching fabric to receive the data packet at a receive time. The transmit time at which the data packet is scheduled to be transmitted from the transmitting tile, and the predetermined switch time, are governed by the common clock with respect to a synchronisation signal with respect to the synchronisation signal.

The time deterministic exchange allows for efficient transfer between the tiles on the die. Each tile has its own local memory which provides the data storage and the instruction storage. As described herein, the IPU is additionally connected to external memory from which data may be transferred onto the IPU for use by the tiles via the fabric chips.

The tiles 1103 of the IPU may be programmed such that a data packet that is transmitted by a SEND instruction from their local program is intended either to access memory (a memory access packet) or to have at its destination another IPU which is connected in the cluster or system. In those cases, the data packet is transmitted onto the switching fabric by the originating tile 1103, but is not picked up by recipient tile within the IPU. Instead, the switching fabric causes the tile to be provided to the appropriate connector C1, C2 etc. for external communication from the IPU. The packet intended for off-chip communication is generated to include information which defines its final off-chip destination but not the external port from which it is to be transmitted. The packet may be transmitted to the external port using the principles of the time deterministic exchange to identify the external port for the packet when code is compiled for the tiles. For example, a memory access packet may identify a memory address. A packet intended for another IPU may include the identifier of the other IPU. This information is used by the routing logic on the fabric chip to correctly route the off-chip packets generated by the IPU.

The diagram in FIG. 1B shows five exemplary regions of the exemplary IPU chip, separated by four boundaries 1105, represented by dashed lines. Note that the dashed lines represent abstract boundaries 1105 of abstract regions on the processor chip, shown for illustrative purposes; the boundaries 1105 do not necessarily represent physical boundaries on an IPU chip.

As well as the incorporation of the logic circuit into a processing unit in the form of a tile processor, it will be appreciated that the logic circuit may be incorporated into a wide variety of processing units or devices.

Various modifications may be made to the examples discussed herein, within the scope of the disclosure.

For example, it will be appreciated that the example shown above is readily extendible to larger power-of-two block sizes. For example, to rotate a 32-byte block, the existing circuitry is duplicated (i.e. laterally so that each layer 202 comprises double the amount of rotators 210, 220, 230) and the input/output/intermediate arrays comprise 32 bytes. An additional layer can then be added comprising 32 2:1 multiplexers, controlled by a bitmask of double the width of the previous layer (i.e. 0xFFFF0000). This pattern can be replicated to provide circuitry for rotating power-of-two blocks of arbitrary size. Similarly, the layer 204 can be omitted to provide circuitry for rotating only 4-byte and 8-byte blocks.

Advantageously, the examples discussed herein provide a means of rotating blocks of relatively large sizes S that avoids complex S:1 arrays. Accordingly, smaller and faster multiplexers are employed, and the need for large quantities of long data path wires is obviated. This helps keep timing paths short.

Furthermore, the examples discussed herein assist in minimising the area cost of processor features to provide optimal performance per unit area. The examples involve hardware resources that are reused across all sizes of rotate instruction, rather than requiring different hardware resources for different block sizes. The technique discussed herein is naturally decomposed into levels and thus very easy to break into pipeline stages by inserting suitable pipeline registers.

In addition, the examples allow the trivial clock gating of unused hardware resources, such that only the required hardware resources are enabled, thereby minimising power consumption.

The invention claimed is:

1. An execution unit configured to execute a computer program instruction to perform a byte-wise rotation operation of an input data block, the execution unit comprising:
    a logic circuit comprising:
        an input data array to receive an input data block comprising N bytes;
        two first layer multiplexer arrays, each first layer multiplexer array configured to:
            receive a first layer data block comprising a respective subset of bytes of the input data block;
            receive a first layer control signal;
            rotate the first layer data block by an amount indicated by the first layer control signal;
        the two first layer multiplexer arrays being configured to respectively output a first rotated first layer data block and a second rotated first layer data block;
        a second layer multiplexer array configured to receive a second control signal, the second layer multiplexer array comprising N multiplexers, each multiplexer configured to select between a corresponding byte of the first and second rotated first layer data blocks based on the second control signal to output a rotated second layer data block, and
    a control signal generator, configured to generate the first layer control signal and second layer control signal based on the received computer program instruction.

2. The execution unit of claim 1, wherein each first layer data block comprises N/2 bytes.

3. The execution unit of claim 1, wherein:
    the input data array is configured to receive an input data block comprising M bytes, where M>N;
    the logic circuit comprises:
        four first layer multiplexer arrays, so as to output first to fourth rotated first layer blocks;

two second layer multiplexer arrays, a first of the second layer multiplexer arrays configured to receive the first and second rotated first layer blocks and output a first rotated second layer data block, a second of the second layer multiplexer arrays configured to receive third and fourth rotated first layer blocks and output a second rotated second layer block;

a third layer multiplexer array configured to receive a third layer control signal, the third layer multiplexer array comprising M multiplexers configured to select between a corresponding byte of the first and second rotated second layer data blocks based on the third control signal to output a rotated third layer data block; and the control signal generator is configured to generate the third layer control signal.

4. The execution unit of claim 1, wherein the logic circuit comprises an intermediate results array configured to receive the output of the first layer multiplexer arrays.

5. The execution unit of claim 1, wherein each first layer multiplexer array comprises a plurality of S:1 multiplexers.

6. The execution unit of claim 1, wherein the second layer control signal comprises a bitmask of N bits, each bit in the bitmask acting as a control signal for a respective one of the N multiplexers of the second multiplexer array.

7. The execution unit of claim 6, wherein the logic circuit comprises a splitter to split the bitmask and supply the respective bits to the respective multiplexers.

8. The execution unit of claim 6, wherein the control signal generator is configured to rotate the bitmask, wherein an amount of rotation of the bitmask results in output of the rotated second layer data block rotated by the same amount.

9. The execution unit of claim 8, wherein the control signal generator is configured to rotate the bitmask by selecting a stored rotated bitmask from a lookup table.

10. The execution unit of claim 3, wherein the third layer control signal is a bitmask of M bits.

11. The execution unit of claim 1, wherein the control signal generator is configured to generate a second layer control signal that causes the second layer multiplexer array to act as a passthrough.

12. The execution unit of any claim 1, wherein
the logic circuit comprises:
a plurality of data path lanes;
one or more clock gates configured to disable one or more of the data path lanes, and
the control signal generator is configured to generate a clock gate control signal to control the one or more clock gates.

13. The execution unit of claim 1, wherein the logic circuit comprises a pipeline register disposed between the first layer multiplexer arrays and second layer multiplexer array.

14. The execution unit of claim 1, wherein the computer program instruction is a rotate instruction, configured to rotate the input data block.

15. The execution unit of claim 1, wherein the computer program instruction comprises a plurality of operations, wherein the rotate operation is one of the plurality of operations.

16. The execution unit of claim 15, wherein the computer program instruction comprises:
a pack instruction, configured to copy a sequence of consecutive bytes from a first position in a first data block into a second location in a second data block, or an extract instruction, configured to extract a sequence of consecutive bytes from a concatenation of a first data block and a second data block.

17. The execution unit of claim 1, wherein the execution unit is configured generate the first layer control signal, and second layer control signal based on values indicated by the computer program instruction.

18. A processing device comprising a plurality of processing units, wherein at least one of the processing units comprises:
an execution unit configured to execute a computer program instruction to perform a byte-wise rotation operation of an input data block, the execution unit comprising:
a logic circuit comprising:
an input data array to receive an input data block comprising N bytes;
two first layer multiplexer arrays, each first layer multiplexer array configured to:
receive a first layer data block comprising a respective subset of bytes of the input data block;
receive a first layer control signal;
rotate the first layer data block by an amount indicated by the first layer control signal;
the two first layer multiplexer arrays being configured to respectively output a first rotated first layer data block and a second rotated first layer data block;
a second layer multiplexer array configured to receive a second control signal, the second layer multiplexer array comprising N multiplexers, each multiplexer configured to select between a corresponding byte of the first and second rotated first layer data blocks based on the second control signal to output a rotated second layer data block, and
a control signal generator, configured to generate the first layer control signal and second layer control signal based on the received computer program instruction.

19. The processing device of claim 18, wherein the processing units are tile processors that communicate via an exchange fabric which implements a time deterministic exchange.

20. A method implemented in an execution unit, the method comprising:
receiving an input data block comprising N bytes;
supplying first layer data blocks comprising a respective subset of bytes of the input data block to a first and second first layer multiplexer array;
supplying a first layer control signal to the first and second first layer multiplexer array;
rotating the first layer data blocks by an amount indicated by the control signal to output a first rotated first layer data block and a second rotated first layer data block;
supplying the first rotated first layer data block and the second rotated first layer data block to a second layer multiplexer array, the second layer multiplexer array comprising N multiplexers,
supplying a second control signal to the second layer multiplexer array to select between a corresponding byte of the first and second rotated first layer data blocks based on the second control signal.

* * * * *